3,146,262
IMINO-ALKYL-UREAS
Werner Schäfer, Cologne-Stammheim, Richard Wegler, Leverkusen, and Ludwig Eue, Cologne-Mulheim, Germany, assignors to Farbenfabriken Bayer Aktiengesellschaft, Leverkusen, Germany, a corporation of Germany
No Drawing. Filed Dec. 20, 1960, Ser. No. 77,024
Claims priority, application Germany Dec. 23, 1959
8 Claims. (Cl. 260—553)

The present invention relates to and has as its objects new and useful herbicidal compounds and processes for their production. Generally the compounds of the present invention may be represented by the following formula:

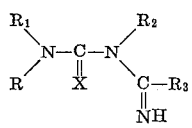

wherein X stands for a chalcogen having an atomic number from 8 to 16, R, $R_1$ and $R_2$ denote aliphatic groups which contain not more than 14 carbon atoms and may be unsaturated, or interrupted by hetero atoms such as with an ether group. It may also be substituted, for example by halogen, hydroxyl or nitro groups.

$R_1$ may also be a hydrogen atom, R may also be an aryl radical or a cycloaliphatic radical which may also carry substituents, $R_2$ may denote, moreover, a hydrogen atom, and $R_3$ denotes an alkyl radical, preferably containing not more than 8 carbon atoms, which should be substituted by halogen atoms, chiefly in the α-position.

In accordance with this invention the aforesaid compounds are obtainable by ways known in principle, for example by the reaction of isocyanates or amidines with carbamic acid halides in the presence of bases. The following reaction schemes may illustrate this:

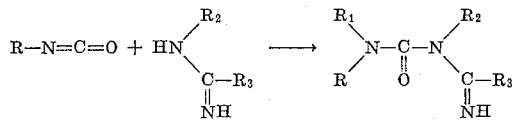

In this case $R_1$ must be hydrogen. The other symbols have the same significance as stated above.

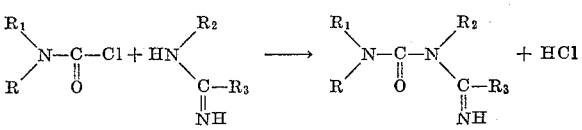

Also in these formulae the symbols have the same significance as stated at the beginning.

The reactions are preferably carried out in the presence of inert solvents, the preferred solvents being aliphatic or aromatic hydrocarbons, chlorobenzene, dioxane, tetrahydrofuran and the like. The slightly exothermic reactions may be carried out at room temperature or at a moderately elevated temperature. Some of the compounds crystallise but some are obtained as oils after distilling off the solvent.

The amidines required as starting products are obtainable according to known processes from the corresponding nitriles and ammonia or primary or secondary amines, they are moreover mostly known from literature.

The compounds produced according to the invention have a strong herbicidal action, which may be illustrated by the following example. Oats, cotton, buckwheat, mustard and grass were sown in seedling dishes. 24 hours after sowing, the dishes were watered with emulsions of the inventive trichloro-acetomethyl-amidine-carbanilide at varying concentrations.

For the preparation of the emulsions, trichloro-acetomethyl-amidine-carbanilide was dissolved in acetone and emulsified with water by the addition of a commercial emulsifier. The quantity of emulsion corresponds to 3000 litres per hectare. 2.5, 5, 10 and 20 kg./ha. of active substance were introduced into the aforesaid quantity of water. 3 weeks after sowing, the damages of the individual plants were evaluated according to 6 degrees of damage (0=no damage, 5=total destruction). The results are listed in the following table:

| Quantity used in kg. per hectare | On oats | On cotton | On buckwheat | On mustard | On grass |
|---|---|---|---|---|---|
| 2.5 | 2–3 | 0 | 5 | 4 | 1 |
| 5 | 3–4 | 1 | 4 | 4–5 | 2 |
| 10 | 5 | 3 | 5 | 5 | 3 |
| 20 | 5 | 4 | 5 | 5 | 4 |

The numbers show that trichloro-acetomethyl-amidine-carbanilide used in large quantities is suitable for the total herbicidal action but that a selective application is possible also.

The following examples are given for the purpose of illustrating the invention.

*Example 1*

33 g. of trichloro-acetamidine, dissolved in 200 ccm. of benzene, are treated at room temperature with stirring with 24 g. of phenyl-isocyanate in 50 ccm. of benzene in small portions. The temperature of the reaction mixture rises from 22 to 40° C. within 10 minutes. The mixture is then stirred at room temperature for about a further 2 hours, filtered off from a small quantity of residue and the benzene solution evaporated down. A pale yellow substance remains. The crude product is rubbed with 50 ccm. of petroleum ether and filtered off. Yield 46 g.; M.P. 110–111° C.

*Analysis.*—$C_9H_8Cl_3N_3O$, M.W. 280.5. Found: C, 38.80%, 38.82%; H, 2.90%, 3.20%; N, 14.92%, 15.22%. Calculated: C, 38.6%; H, 2.86%; N, 14.95%.

*Example 2*

33 g. of trichloro-acetamidine in 200 ccm. of benzene are treated at room temperature with stirring with 31 g. of 3-chlorophenyl-isocyanate in small portions. The temperature rises from 22 to 40° C. within 10 minutes. The reaction mixture is kept at 70–80° C. for a further hour. Upon cooling, 40 g. of crude product of M.P. 148–152° C. crystallise out. Upon evaporation, a further of 16 g. of crude product of the same melting point are obtained from the mother liquor. Both substances are recrystallised together from benzene. The trichloro-acetamidine-carb-3-chloroanilide thus obtained melts at 158° C.

*Analysis.*—$C_9H_7Cl_4N_3O$, M.W. 314.9%. Found: C, 34.21%, 34.36%; H, 2.36%, 2.54%; N, 13.74%, 13.83%. Calculated: C, 34.25%; H, 2.22%; N, 13.33%.

*Example 3*

16 g. of trichloro-acet-amidine in 50 ccm. of benzene are treated at 20° C. for 5 minutes with stirring with 15.3 g. of 4-chlorophenyl-isocyanate in 20 ccm. of benzene. The temperature rises from 20 to 45° C. The reaction mixture is then heated to 70° C. for further 30 minutes. The warm solution is subsequently filtered, whereby a small quantity of di-[p-chlorophenyl]-urea remains. Upon cooling, 17 g. of trichloro-acetamidine-carb-4-chloro-anilide of M.P. 156° C. crystallise out from the mother liquor. A further 6 g. of the compound are obtained from the filtrate by treatment with petroleum ether.

*Analysis.*—$C_9H_7Cl_4N_3O$, M.W. 314.9. Found: C, 34.43%, 34.72%; H, 2.58%, 2.30%; N, 13.26%, 13.55%. Calculated: C, 34.25%; H, 2.22%; N, 13.33%.

*Example 4*

36 g. of trichloro-acetamidine are dissolved in 200 ccm. of benzene and 15 g. of ethyl-isocyanate are then added dropwise at room temperature within 10 minutes. The temperature rises from 20 to 30° C. The solution is then allowed to stand at room temperature for some hours, and the benzene is then distilled off. The residual oil does not crystallise. It is again dissolved in a little hot benzene, filtered and treated while warm with light benzene until cloudy. The substance precipitating in the cold is filtered off and stored in a desiccator over calcium chloride until it becomes powdery; M.P. 85–86° C. Yield 28 g.

*Analysis.*—$C_5H_8Cl_3N_3O$, M.W. 231.4. Found: N, 17.87%, 18.06%. Calculated: N, 18.15%.

*Example 5*

According to the same process there is obtained from trichloro-acetamidine and myristyl-isocyanate in benzene the trichloro-acetamidine-carb-myristylamide as an oil which crystallises after a few days.

*Analysis.*—$C_{17}H_{32}Cl_3N_3O$, M.W. 400.6. Found: N, 10.84%, 11.13%. Calculated: N, 10.52%.

*Example 6*

52.5 g. of trichloro-aceto-N-methylamidine in 150 ccm. of benzene are treated at room temperature with stirring with 35.7 g. of phenyl-isocyanate in small portions. The temperature rises from 22 to 46° C. within 5 minutes. The mixture is stirred at 45° C. for a further 30 minutes and then heated to the boil for 1 hour. It is subsequently filtered and the benzene distilled off. The residual solvent is removed at 12 mm. Hg on the boiling water bath. As residue there remains 75 g. of an oil which solidifies in a glass-like form at room temperature.

*Analysis.*—$C_{10}H_{10}Cl_3N_3O$, M.W. 294.9. Found: C, 41.32%, 41.44%; H, 3.62%, 3.91%; N, 14.62%, 14.64%. Calculated: C, 40.75%; H, 3.40%; N, 14.23%.

*Example 7*

In the same manner there are obtained from 35 g. of trichloro-aceto-N-methylamidine and 25 g. of cyclohexyl-isocyanate in benzene, 54 g. of trichloro-aceto-N-methyl-amidine-carb-cyclo-hexylamide as an oil.

*Analysis.*—$C_{10}H_{16}Cl_3N_3O$, M.W. 300.5. Found: C, 40.62%, 40.69%; H, 5.49%, 5.62%; N, 13.98%, 14.21%. Calculated: C, 40.00%; H, 5.33%; N, 14.02%.

*Example 8*

By the same reaction there are obtained from 52.5 g. of trichloro-aceto-methyl-amidine and 46 g. of 3-chlorophenyl-isocyanate in 150 ccm. of benzene, 93 g. of trichloro-acetomethylamidine-carb-3-chloroanilide as a non-crystallising resin.

*Analysis.*—$C_{10}H_9Cl_4N_3O$, M.W. 328.9. Found, N, 12.27%, 12.57%. Calculated: N, 12.75%.

*Example 9*

52.5 g. trichloro-acteo-N-methylamidine are dissolved in 150 ccm. of benzene. 46 g. of 4-chlorophenyl-isocyanate in 50 ccm. of benzene are added dropwise at 20° C. within 10 minutes with stirring. The temperature rises from 20 to 40° C. The reaction mixture is then heated to 70–80° C. for a further hour and then filtered. The trichloro-aceto - methylamidine-carb-3-chloroanilide thereby crystallises out. The new compound is filtered off and recrystallised from benzene/petroleum ether; M.P. 124–126° C. Yield 80 g.

*Analysis.*—$C_{10}H_9Cl_4N_3O$, M.W. 328.9. Found: C, 36.50%, 36.71%; H: 2.90%, 3.10. Calculated: C, 36.50%; H, 2.74%.

*Example 10*

35 g. of trichloro-aceto-methylamidine are dissolved in 150 ccm. of benzene and 38 g. of 3,4-dichlorophenyl-isocyanate in 50 ccm. of benzene are then added dropwise at room temperature with stirring. The temperature rises from 20 to 47° C. within 9 minutes. The reaction solution is stirred at room temperature for a further 3 hours and the benzene distilled off. The residual oil recrystallises. It is recrystallised from benzene; M.P. 133–135° C., yield 51 g.

*Analysis.*—$C_{10}H_8Cl_5N_3O$, M.W. 363.4. Found: C, 33.11%, 33.40%; H, 2.58%, 2.69%; N, 11.15%, 11.45%. Calculated: C, 33.03%; H, 2.22%; N, 11.58%.

*Example 11*

35 g. of trichloro-aceto-N-methylamindine, dissolved in 150 ccm. of benzene, are treated dropwise at room temperature with stirring with 45 g. of 2,4,5-trichlorophenyl-isocyanate in 50 ccm. of benzene. The temperature then rises from 20 to 41° C. within 5 minutes. The mixture is stirred at room temperature for a further 3 hours, heated to the boil for ½ hour, then filtered cold, and the benzene is distilled off. The residual oil crystallises and is recrystallised from dry cleaning benzene; M.P. 139° C. yield 53 g.

*Analysis.*—$C_{10}H_7Cl_6N_3O$, M.W. 397.8. Found: C, 30.59%, 30.60%; H, 2.18%, 2.39%; N, 10.75%, 10.84%. Calculated: C, 30.20%; H, 1.76%; N, 10.58%.

*Example 12*

35 g. of trichloro-aceto-methylamidine in 150 ccm. of benzene are treated at room temperature with stirring with 33 g. of p-ethoxy-phenyl-isocyanate. The temperature rises from 20 to 43° C. within 3 minutes. The reaction mixture is stirred at room temperature for a further hour and then heated to the boil for another hour. The solution is then filtered until clear and the benzene distilled off. The residual solvent is completely removed on a boiling water bath at a pressure of 12 mm. Hg. The remaining oil solidifies in a glass-like form. Softening point 52° C., yield 59 g.

*Analysis.*—$C_{12}H_{14}Cl_3N_3O_2$, M.W. 338.5. Found: C, 43.61%, H, 4.62%; N, 13.05%. Calculated: C, 42.60%; H, 4.14%; N, 12.42%.

*Example 13*

By the same reaction there are obtained from 35 g. of trichloro-aceto-methylamidine in 150 ccm. of benzene and 34 g. of α-naphthyl-isocyanate in 50 ccm. of benzene, 50 g. of trichloro-aceto-methylamidine-carb-α-naphthyl-amide as a glass-like, brittle mass. Softening point 68° C.

*Analysis*—$C_{14}H_{12}Cl_3N_3O$, M.W. 344.5. Found: N, 12.65%, 12.89%. Calculated: N, 12.23%.

*Example 14*

35 g. of trichloro-aceto-methylamidine in 150 ccm. of benzene are treated at room temperature while stirring with 15 g. of ethyl-isocyanate. The reaction mixture is then stirred at room temperature for a further hour and subsequently heated to a boil for 1 hour. The benzene is then distilled off and the mixture is freed from the solvent in a vacuum on a boiling water bath. As a residue, 40 g. of trichloro-aceto-methylamidine-carb-ethylamide remain in the form of an oil.

*Analysis.*—$C_6H_{10}Cl_3N_3O$, M.W. 246.5. Found: C, 29.88%, 30.18%; H, 4.30%, 4.31%. Calculated: C, 29.30%; H, 4.05%.

*Example 15*

By the same reaction there are obtained from 55 g. of trichloro-aceto-methyl-amidine and 20 g. of n-butyl-isocyanate in benzene, 46 g. of trichloro-aceto-methyl-amidine-carb-n-butylamide as an oil.

*Analysis.*—$C_8H_{14}Cl_3N_3O$, M.W. 274.4. Found: C, 35.47%, 35.59%; H, 5.19%, 5.49%. Calculated: C, 35.10% H, 5.10%.

Example 16

41 g. of torichloro-aceto-isopropyl-amidine in 150 ccm. of benzene are treated with stirring at 20° C. with a solution of 31 g. of 4-chlorophenyl-isocyanate in 50 ccm. of benzene. The temperature rises from 20 to 40° C. within 10 minutes. The solution is then heated to the boil for a further 2 hours, filtered and evaporated down. The remaining oil crystallises upon cooling. The crude product is rubbed with petroleum ether and filtered; M.P. 120°–121° C., yield 59 g.

*Anaylsis.*—$C_{12}H_{13}Cl_4N_3O$, M.W. 356.9. Found: C, 40,66%, 40.95%; H, 3.67%, 3.87%; N, 11.33%, 11.57%. Calculated: C, 40.30%; H, 3.56%; N, 11.77%.

Example 17

By the same reaction there are obtained from 63 g. of trichloro-aceto-n-butyl-amidine in 200 ccm. of benzene and 35 g. of phenyl-isocyanate in 50 ccm. of benzene, 85 g. of trichloro-aceto-n-butyl-amidine-carb-anilide as a non-crystallising resin.

*Analysis.*—$C_{13}H_{16}Cl_3N_3O$, M.W. 336. Found: N, 12.48%, 12.67. Calculated N, 12.49%.

Example 18

By the same reaction there are obtained from 44 g. of trichloro-aceto-n-butyl-amidine in 150 ccm. of benzene and 31 g. of 4-chlorophenyl-isocyanate in 50 ccm. of benzene, 69 g. of trichloro-aceto-n-butyl-amidine-carb-4-chloroanilide as a viscous brown oil.

*Analysis.*—$C_{13}H_{16}Cl_4N_3O$, M.W. 371.0. Found: C, 42.96%, 43.25%; H, 4.19%, 4.40%; N, 11.93%, 12.23%. Calculated: C, 42.2%; H, 4.04%; N, 11.34%.

Example 19

From 41 g. of trichloro-aceto-allyl-amidine in 150 ccm. of benzene and 24 g. of pheny-isocyanate in 50 ccm. of benzene there are obtained in the same manner 59 g. of trichloro-aceto - allyl - amidine-carb-anilide as a glass-like brittle mass.

*Analysis.*—$C_{12}H_{12}Cl_3N_3O$, M.W. 320.5. Found: N, 13.18%, 13.32%. Calculated: N, 13.21%.

Example 20

By the same reaction there are obtained from 40 g. of trichloro-aceto-allyl-amidine in 150 ccm. of benzene and 31 g. of 3-chlorophenyl-isocyanate in 50 ccm. of benzene 67 g. of trichloro-aceto-allyl-amidine-carb-3-chloroanilide as a glass-like brittle mass.

*Analysis.*—$C_{12}H_{11}Cl_4N_3O$, M.W. 355.0. Found: N, 11.42%, 11.56%. Calculated: N, 11.82%.

Example 21

In the same manner there are obtained from 41 g. of trichloro-aceto-allyl-amidine in 150 ccm. of benzene and 31 g. of 4-chlorophenyl-isocyanate in 50 ccm. of benzene, 34 g. of crystalline trichloro-acetallylamidine-carb-4lchloroanilide which melts at 117–119° C. upon recrystallisation from dry cleaning benzene.

*Analysis.*—$C_{12}H_{11}Cl_4N_3O$, M.W. 355.0. Found: N, 11.81%, 11.94%. Calculated: N, 11.82%.

Example 22

54 g. of trichloro-acetamidine are dissolved in 200 ccm. of benzene and 45 g. of phenyl mustard oil are added dropwise at room temperature with stirring, whereby only a slight reaction heat evolves. The solution is allowed to stand at room temperature for 10 hours whereby its color changes to brown. It is then filtered until clear and treated with 400 ccm. of petroleum ether. A pale yellow compound thereby crystallises out. The trichloro-acetamidine-thiocarbanilide thus obtained melts at 94° C. upon recrystallisation from light benzene. Yield 41 g.

*Analysis.*—$C_9H_8Cl_3N_3S$, M.W. 296.5. Found: C, 36.77%, 37.07%; H, 2.92%, 2.97%; S. 10.6%. Calculated: C, 36.5%; H, 2.72%; S, 10.8%.

Example 23

According to the same process as that described in Example 22, there are obtained from 16 g. of trichloro-acetamidine in 150 ccm. of benzene and 20 g. of 3,4-dichlorophenyl mustard oil, 24 g. of trichloroacetamidine-thiocarb-3,4-dichloro-anilide of melting point 112–113° C. as a pale yellow substance.

*Analysis.*—$C_9H_6Cl_5N_3S$, M.W. 365.5. Found: C, 29.72%, 30.00%; H, 1.92, 2.00%; S, 8.7%. Calculated: C, 29.6%; H, 1.64%; S, 8.77%.

Example 24

According to the process described in Example 22 there are obtained from 48 g. of trichloro-acetamidine in 150 ccm. of benzene and 50 g. of p-methoxyphenyl mustard oil, 48 g. of trichloro-acetamidine-thiocarb-4-methoxyanilide which melts at 107–108° C. upon recrystallisation from benzene.

*Analysis.*—$C_{10}H_{10}Cl_3N_3OS$, M.W. 326.8. Found: C, 37.33%, 37.54%; H, 3.13%, 3.29%; S, 9.9%. Calculated: C, 36.8%; H, 3.06%; S, 9.82%.

Example 25

32.5 g. of trichloro-acetamidine, dissolved in 150 ccm. of glycol monomethyl ether acetate are treated with 28 ccm. of triethylamine, and 34 g. of N-phenyl-N-methyl-carbamic acid chloride in 100 ccm. of glycol monomethyl ether acetate are added dropwise to the solution at 40° C. The whole is subsequently heated on a boiling water bath for a further hour, cooled, and the triethylamino hydrochloride is filtered off. The filtrate is evaporated down in a vacuum, the remaining oil dissolved in benzene and shaken out with 200 ccm. of water. The benzene solution is dried over sodium sulfate and the solvent then completely evaporated in a vacuum on a boiling water bath. Residue 33 g. of oil.

*Analysis.*—$C_{10}H_{10}Cl_3N_3O$, M.W. 294.5. Found: N, 13.90%, 13.92%. Calculated: N, 14.28%.

Example 26

According to the same process as that described in Example 25, there are obtained from 50 g. of trichloro-acetamidine, dissolved in 125 ccm. of glycol monomethyl ether acetate and 32 g. of triethylamine by the addition of 34 g. of N,N-dimethylcarbamic acid chloride, 48 g. of trichloro-acetamidine-carb-dimethylamide as an oil.

*Analysis.*—$C_5H_8Cl_3N_3O$, M.W. 232.5. Found: C, 26.54%, 26.64%; H, 3.34%. Calculated: C, 25.9%; H, 3.44%.

Example 27

50 g. of trichloro-aceto-n-dodecylamidine, dissolved in 100 ccm. of benzene are treated at room temperature 5 minutes with a solution of 24 g. of 4-chlorophenyl-isocyanate in 50 ccm. of benzene, the temperature rising by 20 ° C. The solution is heated under reflux for a further hour, then filtered, and, at the end, the benzene is completely distilled off in a vacuum from the filtrate. As residue, 70 g. of a pale brown, glass-like brittle mass are obtained.

*Analysis.*—$C_{21}H_{31}Cl_4N_3O$, M.W. 483.1. Found: N, 8.57%, 8.73%. Calculated: N, 8.68%.

By the same way there may be obtained with phenyl, isocyanate, dichloro-phenyl-isocyanate and trichloro-phenyl-isocyanate the corresponding amidines as non-crystallising glass-like brittle masses.

Example 28

According to the process described in Example 27, there are obtained from 50 g. of trichloro-aceto-n-dodecyl-amidine, dissolved in 100 ccm. of benzene, and 4-nitro-phenyl-isocyanate in 100 ccm. of benzene, 70 g. of tri-chloro-aceto-n-dodecylamidine - carb-4-nitro-anilide as a pale brown, glass-like brittle mass.

*Analysis.*—$C_{21}H_{31}Cl_3N_4O_3$, M.W. 493.5. Found: C, 51.42%, 51.68%; H, 6.29%, 6.48%; N, 11.47%, 11.74%. Calculated: C, 51.2%; H, 6.27%; N, 11.35%.

*Example 29*

According to the same manner as that described in Example 27, there are obtained from 50 g. of trichloro-aceto-n-dodecylamidine, dissolved in 100 ccm. of benzene, and 25 g. of ethoxy phenyl-isocyanate in 50 ccm. of benzene, 72 g. of trichloro-aceto-n-dodecylamidine-carb-4-ethoxy-anilide as a glass-like brittle mass.

*Analysis.*—$C_{23}H_{36}Cl_3N_3O_2$, M.W. 492.6. Found: N, 8.07%, 8.20%. Calculated: N, 8.53%.

*Example 30*

31 g. of α,α-dichloropropion-methylamidine are dissolved in 150 ccm. of benzene and treated with stirring at room temperature with 24 g. of phenyl-isocyanate, the temperature rising from 22 to 50° C. within 5 minutes. The mixture is heated to the boil for a further ½ hour, and the benzene then completely distilled off first under normal pressure and finally in a vacuum. Residue 51 g. of a viscous oil.

*Analysis.*—$C_{11}H_{13}Cl_2N_3O$, M.W. 274.0. Found: C, 47.90%, 48.00%; H, 4.80%, 4.91%. Calculated: C, 48.15%; H, 4.74%.

*Example 31*

According to the same process as that described in Example 30, there are obtained from 31 g. of α,α-dichloropropion-N-methylamidine, dissolved in 150 ccm. of benzene, and 31 g. 4-chlorophenylisocyanate dissolved in 50 cc. benzene, 48 g. of 4-dichloropropion-methyl-amidine-carb-4-chloroanilide, melting at 125–127° C. after recrystallisation from dry cleaning benzene.

*Analysis.*—$C_{11}H_{12}Cl_3N_3O$, M.W. 308.5. Found: C, 43.08%, 43.12%; H, 4.12%, 4.19%; N, 13.25%; 13.55%. Calculated: C, 42.85%; H, 3.90%; N, 13.60%.

*Example 32*

According to the same process as that described in Example 30 there are obtained from 31 g. of α,α-dichloropropion-N-methylamidine and 31 g. of 3-chlorophenylisocyanate in benzene as solvent, 57 g. of α,α-dichloropropion-methyl-amidine-carb-3-chloro-anilide in the form of a glass-like, brittle resin.

*Analysis.*—$C_{11}H_{12}Cl_3N_3O$, M.W. 308.5. Found: C, 43.19%, 43.29%; H, 4.08%, 4.14%; N, 13.26%, 13.47%. Calculated: C, 42.85%; H, 3.90%; N, 13.60%.

*Example 33*

From 25 g. of α,α-dichloropropion-methylamidine, dissolved in 150 ccm. of benzene and 31 g. of 3,4-dichlorophenyl-isocyanate in 50 ccm. of the same solvent, there are obtained according to the same method as that described in Example 30 49 g. of α,α-dichloropropion-methylamidine-carb-3,4-dichlor-anilide as a pale brown resin.

*Analysis.*—$C_{11}H_{11}Cl_4N_3O$, M.W. 344.0. Found, C, 38.98%, 39.25%; H, 3.36%, 3.38%; N, 11.73%, 11.98%. Calculated: C, 38.5%; H, 3,21%; N, 12.21%.

*Example 34*

70 g. of trichloro-aceto-γ-methoxypropylamidine are dissolved in 150 ccm. of benzene and added dropwise at room temperature to 46 g. of 4-chlorophenyl-isocyanate in 50 ccm. of benzene. The temperature rises from 22 to 48° C. within 5 minutes. The solution is heated to the boil for a further hour, and the benzene is then distilled off. The residual oil solidifies upon rubbing with petroleum ether to give crystals. The trichloroaceto-γ-methoxy-propylamidine-carb-4-chloroanilide melts at 98° C. Yield: 103 g.

*Analysis.*—$C_{13}H_{15}Cl_4N_3O_2$, M.W. 387.0. Found: C, 40.71%, 40.86%; H, 3.91%, 4.10%. Calculated: C, 40.3%; H, 3.88%.

*Example 35*

According to the same method as that described in Example 34, there are obtained from 62 g. of trichloro-aceto-γ-ethoxypropylamidine, dissolved in 150 ccm. of benzene, and 30 g. of phenyl-isocyanate 51 g. of trichloro-aceto-γ-ethoxy-propyiamidine-carb-anilide as a pale brown resin.

*Analysis.*—$C_{14}H_{18}Cl_3N_3O_2$, M.W. 366.5. Found: N, 11.57%, 11.81%. Calculated: N, 11.48%

*Example 36*

40 g. of trichloro-acetamidine are dissolved in 200 ccm. of benzene, and 40 g. of 6-chloro-n-hexyl-isocyanate are added dropwise at room temperature within 7 minutes to this solution. The temperature rises from 18 to 30° C. This solution is heated to the boil for 2 hours, subsequently filtered, and the benzene then distilled off. The last residues of the solvent are removed from the oily residue on a boiling water bath at a pressure of 1 mm. Hg. Residue 76 g. of oil.

*Analysis.*—$C_9H_{15}Cl_4N_3O$, M.W. 322.9. Found: N, 12.69%, 12.88%. Calculated: N, 12.98%.

We claim:

1. A carbamide-amidine of the formula:

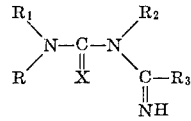

in which X stands for a chalcogen having an atomic number from 8 to 16, R stands for a member selected from the group consisting of hydrogen and lower alkyl having up to 6 carbon atoms, $R_1$ stands for a member selected from the group consisting of "alkyl," cyclohexyl and chloro "alkyl," "alkyl" being a hydrocarbon having up to 18 carbon atoms, phenyl, chloro-phenyl, dichloro-phenyl, trichloro-phenyl, nitro-phenyl, lower alkoxy-phenyl and naphthyl, $R_2$ stands for a member selected from the group consisting of hydrogen, alkyl having up to 18 carbon atoms, and alkenyl having up to 18 carbon atoms and lower alkoxy lower alkyl, and $R_3$ stands for a lower alkyl radical up to 4 carbon atoms and having from 2–3 chlorine atoms.

2. 1 - phenyl-3-methyl-3(2,2,2-trichloro-1-imino ethyl) urea.

3. 1 - (3-chlorophenyl)-3-methyl - 3(2,2,2-trichloro-1-imino ethyl) urea.

4. 1 - (3,4-dichlorophenyl)-3-methyl-3(2,2,2 trichloro-1-imino ethyl) urea.

5. 1 - (2,4,5-trichlorophenyl)-3 - methyl-3-(2,2,2 trichloro-1-imino ethyl) urea.

6. 1 - phenyl - 3 - dodecyl - 3 - (2,2,2 trichloro-1-imino ethyl) urea.

7. 1 - (4-chlorophenyl)-3-dodecyl-3-(2,2,2 trichloro-1-imino ethyl) urea.

8. 1 - (4 - chlorphenyl - 3 - methyl - 3(2,2,2 trichlor-1-imino ethyl) urea.

No references cited.